UNITED STATES PATENT OFFICE.

EMILE J. GUAY, OF LYNN, MASSACHUSETTS, ASSIGNOR TO GENERAL ELECTRIC COMPANY, A CORPORATION OF NEW YORK.

ARC-LAMP ELECTRODE.

998,687.

Specification of Letters Patent.   Patented July 25, 1911.

No Drawing.   Application filed June 26, 1909.   Serial No. 504,529.

*To all whom it may concern:*

Be it known that I, EMILE J. GUAY, a citizen of the United States, residing at Lynn, county of Essex, State of Massachusetts, have invented certain new and useful Improvements in Arc-Lamp Electrodes, of which the following is a specification.

My invention has reference to improvements in electrodes for arc lamps, and it is applicable more particularly to arc lamp electrodes in which titanium carbid is either the sole ingredient or in which this material is used as one of the ingredients in a composite electrode; and the object of the invention is to reduce the spitting of such electrodes and to prevent the adherence to the lamp globe of such particles which are still thrown off. This object is secured by adding to the electrode material an ingredient or ingredients which in the arc fuse with the carbid to a composition, which in the fused or hot state does not adhere to glass.

It has been found that the utility of electrodes containing a considerable percentage of titanium carbid is considerably impaired by the fact that in its use fused particles of the titanium carbid or of the titanium carbid composition are thrown off from the arcing end of the electrode and are projected against the inclosing globe, which, being made of glass, is fused superficially at the points where the hot carbid particles come in contact with the same, and that these particles then stick to the glass. By the continued use of the electrode this spitting of the electrode and the adherence of the projected particles to the glass gradually impairs the transparency of the glass globe, so that after a comparatively short time the globe intercepts so much light that it has to be renewed. It has been found that the globe cannot be cleansed by any mechanical means nor efficiently by any chemical means, and the object of my invention is to avoid the adherence of the projected particles of hot titanium carbid or titanium carbid compounds to the glass.

I have discovered that by the addition of a small percentage of certain materials, particularly the elements belonging to the sulfur group, to the titanium carbid, compounds are formed at the arcing end which in a measure diminish the spitting of the electrode, while the particles which are still thrown off and projected against the inner walls of the globe do not fuse or adhere to the glass, but roll off the same to the bottom, where they collect when the bottom is closed or drop out when the bottom is open. In this manner the transparency of the glass globe is preserved almost indefinitely.

Of the materials which may be used in accordance with my invention as an addition to the titanium carbid I have found free sulfur in a finely divided state to be the best, but selenium or tellurium may be used either singly or mixed with one or both of the other elements of the sulfur group.

My invention, therefore, specifically consists in a titanium carbid electrode containing a small percentage of free sulfur or of any of its described equivalents or mixtures thereof. The range of percentages of sulfur that may be used is rather wide. I have found that the addition of one per cent. of free sulfur to the body of the titanium carbid electrode perceptibly reduces the amount of projected particles that adhere to the glass and that the addition of six per cent. of free sulfur to the titanium carbid electrode is admissible; but I have found that the best result is obtained by the addition of four and one-half per cent. of free sulfur to the titanium carbid electrode body. Selenium or tellurium, or mixtures of two or all three of the elements of the sulfur group, may be used within the same range of percentages.

I desire it to be understood that the term "titanium carbid electrode" as herein used is designed to cover any electrode in which titanium carbid is present to a sufficient extent to give to the arc the titanium characteristics. This includes electrodes made entirely of titanium carbid and also electrodes in the formation of which, in addition to titanium carbid, other materials are employed. The percentages of sulfur hereinbefore referred to are percentages with reference to the titanium carbid present in the electrode. The free sulfur, or selenium, or tellurium, is, in accordance with my invention, incorporated in the electrode by intimately mixing the finely divided sulfur, etc., with the finely divided titanium carbid and the other materials that may be employed in the formation of the electrode body, and then forming the electrode in any of the ordinary, usual, or well-known ways.

What I claim as new and desire to secure by Letters Patent of the United States, is:—

1. A titanium carbid electrode containing a material which fuses with titanium carbid to a compound which in the hot state is non-adherent to glass.

2. A titanium carbid electrode containing one or more free elements of the sulfur group.

3. A titanium carbid electrode containing between one and six per cent. of one or more of the free elements of the sulfur group.

4. A titanium carbid electrode containing between one and six per cent. of free sulfur.

5. A titanium carbid electrode containing four and one-half per cent. of free sulfur intimately mixed in the body of the electrode.

In witness whereof I have hereunto set my hand this 25th day of June, 1909.

EMILE J. GUAY.

Witnesses:
BENJAMIN B. HULL,
HELEN ORFORD.